United States Patent Office 3,839,393
Patented Oct. 1, 1974

3,839,393
AMMONIUM AND ALKALI METAL SALTS
OF SULFATO-ALKANE ACRYLATES AND
METHACRYLATES
Robert Steckler, Crofton, Md., assignor to
Alcolac Inc., Baltimore, Md.
No Drawing. Filed Aug. 31, 1972, Ser. No. 285,183
Int. Cl. C07c 141/00; C08f 15/00, 15/40
U.S. Cl. 260—458                                    6 Claims

ABSTRACT OF THE DISCLOSURE

Monomers of ammonium and alkali metal salts of sulfatoalkane acrylates and methacrylates, which are useful as polymerizable comonomers in emulsion polymerizations, as comonomers for the preparation of membranes and polyelectrolyte complexes, and as comonomers functioning as dye acceptors in the preparation of acrylonitrile copolymers, vinyl chloride copolymers, etc., are prepared by condensing the addition product of an alkylene epoxide and acrylic or methacrylic acid with a sulfating agent, such as sulfamic acid, in the presence of an organic amide, i.e., urea, etc., as a catalyst and in the presence of a polymerization inhibitor such as, for example, hydroquinone at a temperature of about 90°–120° C. for a period of time sufficient to give a high degree of conversion as determined by the acid number of the reaction mixture. The resulting monomers are characterized by the following formula:

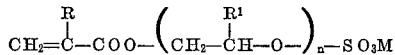

wherein R is either hydrogen or methyl, R¹ is either hydrogen or alkyl of from 1 to 22 carbon atoms, n is at least one positive integer of from 1 to 3 when R¹ is either hydrogen or alkyl of from 1 to 2 carbon atoms and only one positive integer when R¹ is an alkyl of from 3 to 22 carbon atoms, and M is either ammonium or an alkali metal, e.g. sodium, potassium or lithium.

This invention relates to a new class of polymerizable ammonium and alkali metal salts of sulfatoalkane acrylates and methacrylates and to a method of their preparation.

The principal object of the present invention is to provide a new class of sulfated polymerizable monomers and the method of their preparation.

Other objects and advantages will become apparent from the following description.

It is known that polymerizable sulfo esters of alpha-methylene carboxylic acids can be prepared by reacting an alpha-methylene carboxylic acyl chloride such as acryloyl or methacryloyl chloride with an alkali metal salt of a hydroxysulfonic acid such as, for example, sodium isethionate, while dispersed in an inert diluent at elevated temperature. The monomers thus prepared as sulfonates and not sulfates. The economic shortcoming in this preparation is the high cost of the alpha-methylene carboxylic acyl chlorides as well as their toxic effect on human skin and mucous membrane.

I have found that polymerizable ammonium and alkali metal salts of sulfatoalkane acrylates and methacrylates having the formula:

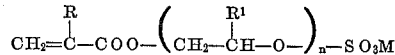

wherein R is either hydrogen or methyl, R¹ is either hydrogen or alkyl of from 1 to 22 carbon atoms, n is at least one positive integer of from 1 to 3 when R¹ is either hydrogen or alkyl of from 1 to 2 carbon atoms and only one positive integer when R¹ is an alkyl of from 3 to 22 carbon atoms, and M is either ammonium or an alkali metal, e.g. sodium, potassium or lithium, are prepared by condensing one mole of a hydroxy alkane acrylate or methacrylate of the formula:

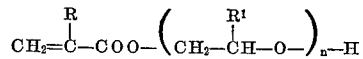

wherein R, R¹, and n have the same values as above, with 0.1 mole to 2 moles of sulfamic acid in the presence of an organic amide as a catalyst such as urea, acetamide, dicyandiamide, and the like, and in the presence of polymerization inhibitor such as hydroquinone, catechol, di-tert-butyl para cresol, hydroquinone monomethyl ether, or any one of the conventionally employed polymerization inhibitors, at a temperature ranging from about 90° to about 120° C. for a period of time sufficient to give a conversion of at least 60% of sulfamic acid as determined by the acid number of the reaction mixture. The actual time may range from about 2–4 hours.

The inhibitor is employed as a precautionary measure, i.e., to inhibit the homopolymerization of the reaction product. The amount of inhibitor to be employed may range from about 0.01% to about 1.0% by weight based on the weight of the hydroxyalkane acrylate or methacrylate employed in the reaction.

The amount of catalyst that may be employed is variable and may range from about 1% to about 5% by weight based on the weight of the hydroxyalkane acrylate or methacrylate.

As pointed out above the amount of sulfamic acid may range from 0.1 mole to about 2 moles, per mole of the hydroxyalkane acrylate or methacrylate for reasons which will become more clearly evident from illustrative working example II. For the time being, suffice it to say that when an amount smaller than 1 mole, say about 0.5 mole of sulfamic acid is employed per mole of hydroxyalkane acrylate or methacrylate, a partially sulfated alkane acrylate or methacrylate is formed. The excess of the hydroxyalkane acrylate or methacrylate that is employed results in a higher degree of conversion of the sulfamic acid. As a consequence, the final reaction mixture contains less of unreacted sulfamic acid. In addition, the excess of the hydroxyalkane acrylate or methacrylate functions as a solvent for the resultant sulfated monomer and prevents excessive crystallization and heterogeneity when the reaction mixture is left to stand. With the small mole ratio, 0.5 to 1.0, up to 90–95% of the theoretical amount of sulfamic acid will be reacted.

If the reaction mixture, which is a viscous liquid, is allowed to stand at room temperature, or preferably at 0°–10° C., for a period of a few hours to several days, the pure crystalline ammonium salt begins to separate. The crystals can be isolated by filtration or by centrifuging, followed by washing the crystals with organic solvents such as benzene, toluene, etc., in which the unsulfated starting material, i.e., hydroxyalkane acrylate or methacrylate, is readily soluble. For economic reasons it is not necessary to wash the crystals with benzene, etc., since the resulting product of the reaction, i.e., viscous liquid having a reddish purple color, is readily suitable for polymerization reactions and for various industrial applications such as protective and decorative coatings, textile binders, paper coatings, etc.

The hydroxy alkane acrylates and methacrylates utilized in accordance with the present invention are readily prepared in the conventional manner by the addition of one mole of an alkylene or arylene oxide (or aromatic epoxide) of the formula:

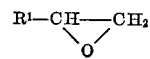

wherein R¹ has the same values as above with one mole of acrylic or methacrylic acid.

The aliphatic epoxides include ethylene oxide, 1,2-propylene oxide, and 1,2-butylene oxide; and alkylene oxides containing from 5 to 22 carbon atoms which are obtained by the epoxidation of straight or branched chained alpha-olefins of from 5 to 22 carbon atoms or a mixture of such alpha-olefins by a peracid directly or by a chlorohydrin and caustic route. The epoxides may be derived from cracked wax and may contain both an even and odd numbered carbon atoms in the alkyl carbon chain. The odd-numbered alkyl carbon chain also may be derived from raw materials originating either from the Ziegler synthesis (ethylene) or from fatty sources.

The aromatic epoxides include styrene oxide, alkyl styrene oxides, 4 vinyl cyclohexene-1 monoxide (3-vinyl-7-oxabicyclo[4.1.0]heptane).

It is to be noted, that when one mole of a lower aliphatic epoxide, e.g. ethylene oxide, 1,2-propylene oxide or 1,2-butylene oxide is added to one mole of acrylic or methacrylic acid in the conventional commercial process a mixture is obtained. To illustrate this point, when 1 mole of ethylene oxide is added to 1 mole of methacrylic acid (or acrylic acid) a mixture is obtained containing a substantial amount, about 95%, of the monomethacrylate of ethylene glycol of the formula:

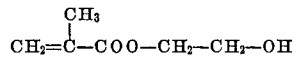

from about 1 to 4.0% of the monomethacrylate of diethylene glycol of the formula:

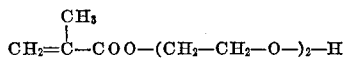

and from zero to about 0.1% of the monomethacrylate of triethylene glycol of the formula:

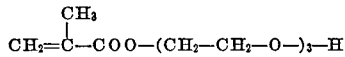

together with small amounts of ethylene glycol, methacrylic acid (or acrylic acid if such is used) and ethylene glycol di-methacrylate.

From the foregoing mixture, it is clearly apparent that the reaction product is predominantly the monomethacrylate of ethylene glycol. A mixture of somewhat similar percentages is obtained by reacting acrylic or methacrylic acid with 1,2-propylene oxide, or 1,2-butylene oxide. With alkylene oxides (aliphatic epoxides) containing from 5 to 22 carbon atoms the addition reaction is predominantly straight forward, i.e., substantially a mole per mole addition reaction product is obtained.

The following examples serve to further illustrate the invention, but are not to be construed in limitation thereof.

EXAMPLE I

Into a 1000 ml. 3-necked flask, equipped with thermometer, agitator, and electric heating mantle, there were added 260 grams (2 moles) of a commercial grade of hydroxy ethyl methacrylate (mixture containing 96% of a monomethacrylate of ethylene glycol, 3.0% of monomethacrylate of diethylene glycol and 0.1% of monomethacrylate of triethylene glycol), 0.2 gram of monomethyl ether of hydroquinone (MEHQ) as polymerization inhibitor, and 3.6 grams of urea as catalyst. The mixture was heated to 70° C. and 196 grams (1.96 moles) of powdered sulfamic acid added over a period of 50–60 minutes while the temperature was allowed to rise to 90°–95° C. The temperature was raised to 110° C. to completely dissolve the sulfamic acid and held at 105°–110° for 3 hours at which time the acid number remained constant and showed a 91% conversion of sulfamic acid.

The reaction product was cooled to room temperature and diluted with 150 grams of water. The percent conversion was determined by acid number and showed a yield of 91.4% of the ammonium sulfate monomer. The activity by unsaturation was 104%.

The product was neutralized to a pH 5–6 by the addition of 20 grams of 35% aqueous ammonium hydroxide.

The final product was a reddish-purple viscous liquid and began to partially crystallize on standing at room temperature overnight.

It is to be noted that the resulting ammonium sulfate monomer may be cooled below room temperature, i.e. to about 0° C. and allowed to stand for several hours. Thereafter sufficient aqueous alkali metal hydroxide may be added to the product which is then heated to about 60°–75° C. to remove the ammonia and to yield the corresponding alkali metal salt.

EXAMPLE II

Into the same type of flask as employed in Example I there were added 524 grams (4.04 moles) of the same commercial grade of hydroxyl ethyl methacrylate as employed in Example I, 5.2 grams of urea and 1.3 grams of hydroquinone. The mixture was heated to 80° C. and 205 grams (2.11 moles) of powdered sulfamic acid added over a period of one hour while allowing the temperature to rise to 95°–100° C. The reaction mixture was held at 95°–100° C. until the acid number remained constant. This took about 2–4 hours and the reaction leveled off at about 95% conversion of sulfamic acid into the ammonium sulfate product.

The composition of the resulting product was:

56.4% ammonium salt of sulfato ethyl methacrylate
42.2% of unreacted hydroxy ethyl methacrylate
1.4% of unreacted sulfamic acid From the foregoing example, it will be evident that due to the fact that only one mole of sulfamic acid was employed per two moles of the commercial grade hydroxyethylmethacrylate a partial sulfated hydroxy ethyl methacrylate is formed. The excess (about two moles) commercial grade hydroxy ethyl methacrylate is unreacted and as a consequence aids the reaction in attaining a higher degree of conversion of the sulfamic acid. Moreover, it is also evident that the final reaction product contains less of unreacted sulfamic acid. In addition, it acts as a solvent for the unreacted sulfamic acid and the ammonium sulfate product, thereby decreasing viscosity to an easily handled, fluid range.

EXAMPLE III

Example I was repeated with the exception that 2.0 moles of the commercial grade of hydroxy ethyl methacrylate was replaced by 2.0 moles (232 grams) of commercial grade hydroxy ethyl acrylate containing 95.3% monoacrylate of ethylene glycol, 3.5% of monoacrylate of diethylene glycol and 0.1% of monoacrylate of triethylene glycol.

After 3 hours at 105°–110° C., the reaction leveled off at 91% conversion of sulfamic acid. The product was a reddish-purple viscous liquid which began to partially crystallize on standing at room temperature overnight.

EXAMPLE IV 48.25 grams (0.5 moles) of powdered sulfamic acid, 0.1 gram of hydroquinone and 1 gram of powdered urea were dispersed at room temperature in 144 grams (1 mole) of commercial hydroxypropyl methacrylate (containing 96% of monomethacrylate of propylene glycol, 2.4% of monomethacrylate of dipropylene glycol and 0.1% of monomethacrylate of tripropylene glycol) in a pebble mill until a smooth, translucent uniform dispersion was obtained. The latter takes abount 1–2 hours.

The paste was removed from the mill and transferred into a 1000 ml. three neck flask equipped with agitator, thermometer and electric heating mantle. The paste was agitated and heated to 100° C. and held at this temperature for about 30 minutes after which 60% of the initial sulfamic acid was converted into the ammonium sulfate of hydroxypropyl methacrylate.

After heating at 100° C. for additional 30 minutes, the conversion was 72%. After a total of 90 minutes heating at 100° C., a conversion of 82.6%, based on the sulfamic acid, was obtained.

The product is a clear, reddish viscous liquid.

EXAMPLE V

In a 500 ml. three necked flask equipped as in example I there were added 68 grams (0.47 moles) of commercial grade hydroxy butyl acrylate (containing 96% of the monoacrylate of butylene glycol, 1.8% of the monoacrylate of dibutylene glycol and 0.1% of the monoacrylate of tributylene glycol) 0.27 grams of MEHQ and 1.5 grams of urea.

The mixture was heated to 80° C. at which time 46 grams of sulfamic acid were added during a period of one hour while the temperature was permitted to rise to 95°–100° C. The reaction was held at about 100° C. until the acid number remained constant. After 2¾ hours the reaction leveled off with a 91.5% conversion of sulfamic acid.

The resulting clear, viscous reddish liquid was allowed to cool to room temperature for 2 hours during which crystalline ammonium sulfate of the hydroxy butyl acrylate began to separate. The liquid was allowed to stand at room temperature overnight and the crystals were separated and washed with toluene and dried at room temperature. The resulting crystals are nearly colorless.

EXAMPLE VI

Into a 1000 ml. 3-neck flask equipped with stirrer, thermometer and heating mantle there were added 256 grams (1 mole) of 2-hydroxy dodecyl-1-acrylate (obtained by the reaction of epoxidized dodecene with acrylic acid), 0.25 gram of MEHQ and 4 grams of urea. The mixture was heated to 80° C. at which time 102 grams (approx. 1 mole) of sulfamic acid were added to the mixture during a period of one hour and the temperature permitted to rise to 105°–110° C. The reaction mixture was held at this temperature for 3 hours, at which time the acid number remained fairly constant to give a 93% conversion of sulfamic acid.

The reddish-purple viscous liquid was cooled to room temperature and partially crystallized on standing overnight. The crystals were separated by filtration washed with hexane followed by two ethanol washings and dried at room temperature. The product, ammonium salt of sulfated 2-hydroxy dodecyl-1-acrylate, has the following formula:

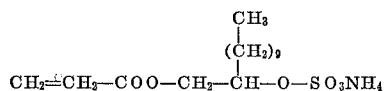

EXAMPLE VII

Example VI was repeated with the exception that the 256 grams of 2-hydroxy dodecyl-1-acrylate were replaced by 262 grams of a product obtained by reacting 1 mole of acrylic acid with 1 mole of the oxide of a mixture of $C_{11-14}$ alpha-olefins, commercially available under the trade-designation "Nedox 1114."

A 89.5% conversion was obtained. The product is very viscous purplish-red liquid. The isolated crystals are almost colorless.

EXAMPLE VIII

Into a two liter polymerization vessel there were charged 229.2 grams of de-ionized water and nitrogen purge begun. The vessel was heated to 80° C. and 6 ml of 5% aqueous solution of the ammonium sulfate monomer of Example II added followed by the addition of 3 grams of a pre-mix consisting of 161.1 grams of styrene, 135 grams of n-butyl acrylate and 3.9 grams of methacrylic acid together with 10.8 grams of a 10% aqueous solution of sodium persulfate as catalyst. The temperature was maintained at 80° with external heating for 10–15 minutes after which the gradual addition of 297 grams of the aforesaid pre-mix and 54 ml. of the 5% aqueous solution of the ammonium sulfate product of Example II was begun and lasted for a period of 3 hours. Thereafter the reaction mixture was externally heated to 83°–85° C. for one hour and then cooled to room temperature. The resulting terpolymer emulsion has the following physical properties:

| | |
|---|---|
| Percent Solids | 50.0 |
| pH | 2.3 |
| Viscosity, cps. | a 110 | a Brookfield Spindle #2 60 r.p.m.

The terpolymer solution can be effectively employed as a textile binder, paper coatings, and the like.

It is to be noted that the reaction products of Examples I to VII may be purified further, if desired, by repeated recrystallization.

I claim:

1. A polymerizable monomer having the formula:

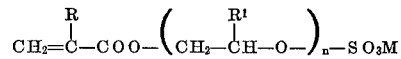

wherein R is selected from the group consisting of hydrogen and methyl, $R^1$ is selected from the group consisting of hydrogen and alkyl of from 1 to 22 carbon atoms, $n$ is an integer of from 1 to 3 when $R^1$ is hydrogen or alkyl of from 1 to 2 carbon atoms and $n$ is only 1 when R is an alkyl of from 3 to 22 carbon atoms, and M is a salt forming cation selected from the group consisting of ammonium and alkali metal.

2. A polymerizable monomer having the formula:

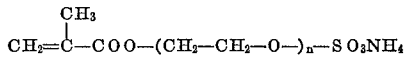

wherein $n$ is an integer of from 1 to 3.

3. A polymerizable monomer having the formula:

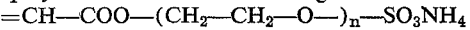

wherein $n$ is an integer of from 1 to 3.

4. A polymerizable monomer having the formula:

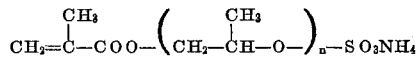

wherein $n$ is an integer of from 1 to 3.

5. A polymerizable monomer having the formula:

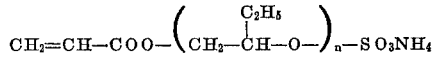

wherein $n$ is an integer of from 1 to 3.

6. A polymerizable monomer having the formula:

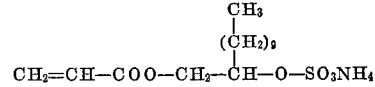

References Cited

UNITED STATES PATENTS

| | | | |
|---|---|---|---|
| 3,689,532 | 9/1972 | Emmons et al. | 260—458 |
| 2,733,255 | 1/1956 | Lindsey | 260—458 |
| 2,695,914 | 11/1954 | De Groote | 260—456 P |

JOSEPH E. EVANS, Primary Examiner

U.S. Cl. X.R.

162—158; 252—8.75; 260—80.76, 85.5 ES, 86.1 R, 87.7, 89.5 R, 486 B